United States Patent
Eble et al.

(10) Patent No.: US 10,761,821 B1
(45) Date of Patent: Sep. 1, 2020

(54) OBJECT ORIENTED PROGRAMMING MODEL FOR GRAPHICS PROCESSING UNITS (GPUS)

(71) Applicant: SAP SE, Walldorf (DE)

(72) Inventors: Markus Eble, Walldorf (DE); Torsten Ihben, Walldorf (DE); Klaus Kretzschmar, Angelbachtal (DE); Matthias Liedtke, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/365,892

(22) Filed: Mar. 27, 2019

(51) Int. Cl.
G06F 8/41 (2018.01)
G06F 9/54 (2006.01)
G06F 8/20 (2018.01)
G06T 1/20 (2006.01)
G06F 9/48 (2006.01)

(52) U.S. Cl.
CPC .......... *G06F 8/451* (2013.01); *G06F 8/24* (2013.01); *G06F 9/4843* (2013.01); *G06F 9/544* (2013.01); *G06T 1/20* (2013.01)

(58) Field of Classification Search
CPC .................................. G06F 8/451; G06F 8/24
USPC .................................................. 717/136–161
See application file for complete search history.

(56) References Cited

U.S. PATENT DOCUMENTS

| 6,985,937 | B1 * | 1/2006 | Keshav | G06F 9/505 370/231 |
| 8,499,018 | B2 | 7/2013 | Kretzschmar et al. | |
| 8,589,867 | B2 * | 11/2013 | Zhang | G06F 8/45 717/106 |
| 9,026,857 | B2 | 5/2015 | Becker et al. | |
| 9,069,832 | B2 | 6/2015 | Becker et al. | |
| 9,619,215 | B2 | 4/2017 | Eble et al. | |
| 2007/0121425 | A1 | 5/2007 | Eble et al. | |
| 2007/0157168 | A1 | 7/2007 | Traxel et al. | |

(Continued)

OTHER PUBLICATIONS

Pratt-Szeliga, Philip C., James W. Fawcett, and Roy D. Welch. "Rootbeer: Seamlessly using gpus from java."2012 IEEE 14th International Conference on High Performance Computing and Communication & 2012 IEEE 9th International Conference on Embedded Software and Systems. IEEE, 2012.pp. 375-380 (Year: 2012).*

(Continued)

*Primary Examiner* — Satish Rampuria
(74) *Attorney, Agent, or Firm* — Fish & Richardson P.C.

(57) ABSTRACT

Implementations of the present disclosure include receiving object-oriented source code including a set of kernel functions and a set of invocations, each invocation invoking one or more kernel functions, each kernel function being marked within the source code as being GPU-enabled and referencing a information object and a grid configuration object, the grid information object defining a number of threads for executing the kernel function within the GPU, and the grid configuration object defining a configuration of threads for executing the kernel function within the GPU, the source code capable of being compiled to one of binary code that is executable by a CPU and binary code that is executable by a GPU without modification, compiling the object-oriented source code to provide binary code that is executable by a GPU, and executing the binary code using the GPU to execute the kernel function within an in-memory database system.

17 Claims, 9 Drawing Sheets

(56) References Cited

U.S. PATENT DOCUMENTS

| | | | | |
|---|---|---|---|---|
| 2007/0294681 | A1* | 12/2007 | Tuck | G06F 11/3404 717/149 |
| 2010/0153167 | A1 | 6/2010 | Kretzschmar et al. | |
| 2013/0187936 | A1* | 7/2013 | Xiaocheng | G06T 1/20 345/522 |
| 2015/0149745 | A1 | 5/2015 | Eble et al. | |
| 2015/0324707 | A1* | 11/2015 | Zhou | G06F 11/3409 717/124 |

OTHER PUBLICATIONS

Gupta, Vishakha, et al. "GViM: GPU-accelerated virtual machines." Proceedings of the 3rd ACM Workshop on System-level Virtualization for High Performance Computing. 2009.pp. 17-24 (Year: 2009).*

Jablin, Thomas B., et al. "Automatic CPU-GPU communication management and optinnization."Proceedings of the 32nd ACM SIGPLAN conference on Programming language design and implementation. 2011.pp. 142-151 (Year: 2011).*

Springer, Matthias, and Hidehiko Masuhara. "DynaSOAr: A Parallel Memory Allocator for Object-Oriented Programming on GPUs with Efficient Memory Access." arXiv preprint arXiv:1810.11765 (2018).pp. 16.1-16.36 (Year: 2018).*

Álvarez, José A., Javier Roca-Piera, and José J. Fernández. "From structured to object oriented programming in parallel algorithms for 3D image reconstruction." Proceedings of the 8th workshop on Parallel/High-Performance Object-Oriented Scientific Computing. 2009.pp. 1-8 (Year: 2009).*

Lemeire, Jan, et al. "Towards fully user transparent task and data parallel image processing." 2009 Proceedings of 6th International Symposium on Image and Signal Processing and Analysis. IEEE, 2009.pp. 620-625 (Year: 2009).*

Developer.Nvidia.com [online], "CUDA Zone," Cuda Zone, 2019, [retrieved on Mar. 15, 2019], retrieved from: URL <https://developer.nvidia.com/cuda-zone>, 19 pages.

Khronos.org [online], "The Open Standard for Parallel Programming of Heterogeneous Systems," OpenCL Overview, 2019, [retrieved on Mar. 15, 2019], retrieved from: URL <https://www.khronos.org/opencl/>, 9 pages.

Openmp.org [online], "OpenMP," OpenMP Home Page, 2019, [retrieved on Mar. 15, 2019], retrieved from: URL<https://www.openmp.org/#>, 4 pages.

* cited by examiner

```
// calculates the distance between two points
__gpu_enabled__ Double distance(Double px, Double py, Double qx, Double qy) {
    Double diffx = px - qx;
    Double diffy = py - qy;
    return math::sqrt(diffx * diffx + diffy * diffy);
}
```

FIG. 3A

__gpu_kernel__ and invocation

```
__gpu_kernel__ void multiply(GpuGridInfo& gi, ForeignArray<Int32>& data, Int32 factor) {
    Size index = gi.getThreadIdx() + gi.getBlockIdx() * gi.getThreadCountX();
    data[index] = factor * data[index];
} void callGpuKernel(ForeignArray<Int32>& data) {
    Size threadsPerBlock = 256z; // group execution in blocks of 256 threads
    Size blocks = (data.getSize() + threadsPerBlock - 1) / threadsPerBlock;
    GpuGridConfig gridConfig(blocks, threadsPerBlock); // this will result in
    one worker per data element
    Int32 factor = 3; // multiply each element with 3
    gpu::gridInvoke(gridConfig, bind(multiply, data, factor)); // invoke:
    pass arguments and invoke instances of "multiply" function
}
```

FIG. 3B

```
Object transfer for multiple invokes
_gpu_kernel Void multiply(GpuGridInfo& gi, ForeignArray<Int32>& data, Int32
factor) {
   Size index = gi.getThreadIdX() + gi.getBlockIdX() * gi.getThreadCountX();
   data[index] = factor * data[index];
}                                                                              } 330a
_gpu_kernel Void add(GpuGridInfo& gi, ForeignArray<Int32>& data, Int32
value) {
   Size index = gi.getThreadIdX() + gi.getBlockIdX() * gi.getThreadCountX();   } 330b
   data[index] = data[index] + value;
}
                    332
Void callMultipleGpuKernels(ForeignArray<Int32>& data, ForeignArray<Int32>
constantsAdd) {
   Size threadsPerBlock = 256z;
   Size blocks = (data.getSize() + threadsPerBlock - 1) / threadsPerBlock;
   gpu::Stream stream;
   {
      GpuGridConfig gridConfig(blocks, threadsPerBlock); // in this example
we use the same GpuGridConfig for both invokes
      gpu::Transfer transferDataArray(data, stream) // construction triggers
transfer to GPU
         334
      {
         gpu::Transfer transferConstantsAdd(constantsAdd, stream); //
construction triggers transfer to GPU
         gpu::gridInvoke(gridConfig, _bind(add, data, constantsAdd), stream);  } 330d
// arguments "data" and "constantsAdd" have already been transferred to
GPU, no transfer is needed on invoke; also no transfer back is performed.
      } // "transferConstantsAdd" is destroyed and releases the memory on GPU
      Int32 factor = 3;
      gpu::gridInvoke(gridConfig, _bind(multiply, data, factor), stream); //
argument "data" is already on GPU; "factor" isn't explicitly managed, so
the gridInvoke will handle the memory management for this argument
implicitly
   } // "transferDataArray" is destroyed and transfers data back to main
memory on destruction and rleases the memory on GPU
   // the data has been transferred back to main memory and can be used on
CPU again
   // [...]
}
```

*FIG. 3C*

```
execution phases

__gpu_kernel void kernel(ForeignArray<Int32> fi, ForeignArray<Int32>& fo) {
    gpu_shared ForeignArray<Int32> fi_shared;
    gpu_shared ForeignArray<Int32> fo_shared;
    phased_execution "load" {
        // load data from fi to fi_shared
    }
    phased_execution "process" {
        // execution operation reading data from fi_shared and storing results
        in fo_shared
    }
    phased_execution "aggregate" {
        // aggregate results in fo_shared
    }
}
```

FIG. 3D

Reduction

```
__gpu_kernel Void kernel(GpuGridInfo& gridInfo, ForeignArray<Int32>
inputData, Int32& finalResult) {
// calculation of partial result, one per thread
// [...]
Int32 partialResult = /* [...] */;
reduce(gi, DEVICE, partialResult, add, &finalResult);
```

OBJECT ORIENTED PROGRAMMING MODEL FOR GRAPHICS PROCESSING UNITS (GPUS)

BACKGROUND

Central processing units (CPUs) can be described as electronic circuitry that execute instructions of a computer program (e.g., executing the arithmetic, logic, control, and input/output (I/O) operations specified by the instructions). The CPU is separate from memory, but interacts with memory, often referred to as main memory, to retrieve and/or store data. The workload demand on CPUs has significantly increased over the years, pushing the limits of CPU ability to efficiently process data. Graphics processing units (GPUs) have been adopted for processing such intensive workloads. GPUs provide a higher computational throughput and are more energy efficient than traditional CPUs. In some architectures, both CPUs and GPUs are implemented together.

GPU programming, however, is complicated and error prone. For example, each GPU has its own memory. Consequently, explicit data transfer between main memory and GPU memory is needed. As another example, error detection and analysis are difficult, because different tools with different scopes are needed for CPUs and GPUs. In some systems, GPUs might not be available. Consequently, it can be necessary to develop a program twice, one for systems including a GPU, another for systems without. As still another example, parallelization concepts of GPUs and CPUs are different, and require different algorithm implementations. Further, highly parallel algorithms tend to be complex, and as such, synchronization between threads is needed. This can impede scalability or even lead to deadlocks.

SUMMARY

Implementations of the present disclosure are generally directed to providing applications to be executed by central processing units (CPUs) and/or graphics processing units (GPUs). More particularly, implementations of the present disclosure are directed to an object-oriented programming model and interface for developing applications for execution on CPUs and/or GPUs.

In some implementations, actions include receiving object-oriented source code defining a set of kernel functions including one or more kernel functions and a set of invocations including one or more invocations, each invocation invoking one or more kernel functions, each kernel function being marked within the object-oriented source code as being GPU-enabled and referencing a GPU grid information object and a GPU grid configuration object, the GPU grid information object defining a number of threads for executing the kernel function within the GPU, and the GPU grid configuration object defining a configuration of threads for executing the kernel function within the GPU, the object-oriented source code capable of being compiled to one of binary code that is executable by a CPU and binary code that is executable by a GPU without modification, compiling the object-oriented source code to provide binary code that is executable by a GPU of an in-memory database system, and executing the binary code using the GPU to execute the kernel function within the in-memory database system. Other implementations include corresponding systems, apparatus, and computer programs, configured to perform the actions of the methods, encoded on computer storage devices.

These and other implementations may each optionally include one or more of the following features: an invocation references multiple kernel functions that are to be invoked and defines a transfer for maintaining data within memory of the GPU between invocations of the multiple kernel functions, the data only being transferred to main memory of the in-memory database system after the multiple kernel functions have completed execution; the transfer references a stream object; at least one kernel function defines multiple execution phases based on shared memory within the GPU, every thread completing a phase before any thread can execute a subsequent phase; a reduction is defined within the object-oriented source code to merge partial results from multiple kernel functions into a final result, the reduction being executed after all kernel functions of the multiple kernel functions have completed computation of respective partial results; the configuration of threads defines on or more of warps of threads and blocks of threads within the GPU; and the object-oriented source code is compiled by the CPU within the in-memory database system and is provided to the GPU for execution.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3E depict example object-oriented code in accordance with implementations of the present disclosure.

DETAILED DESCRIPTION

Figure 1:
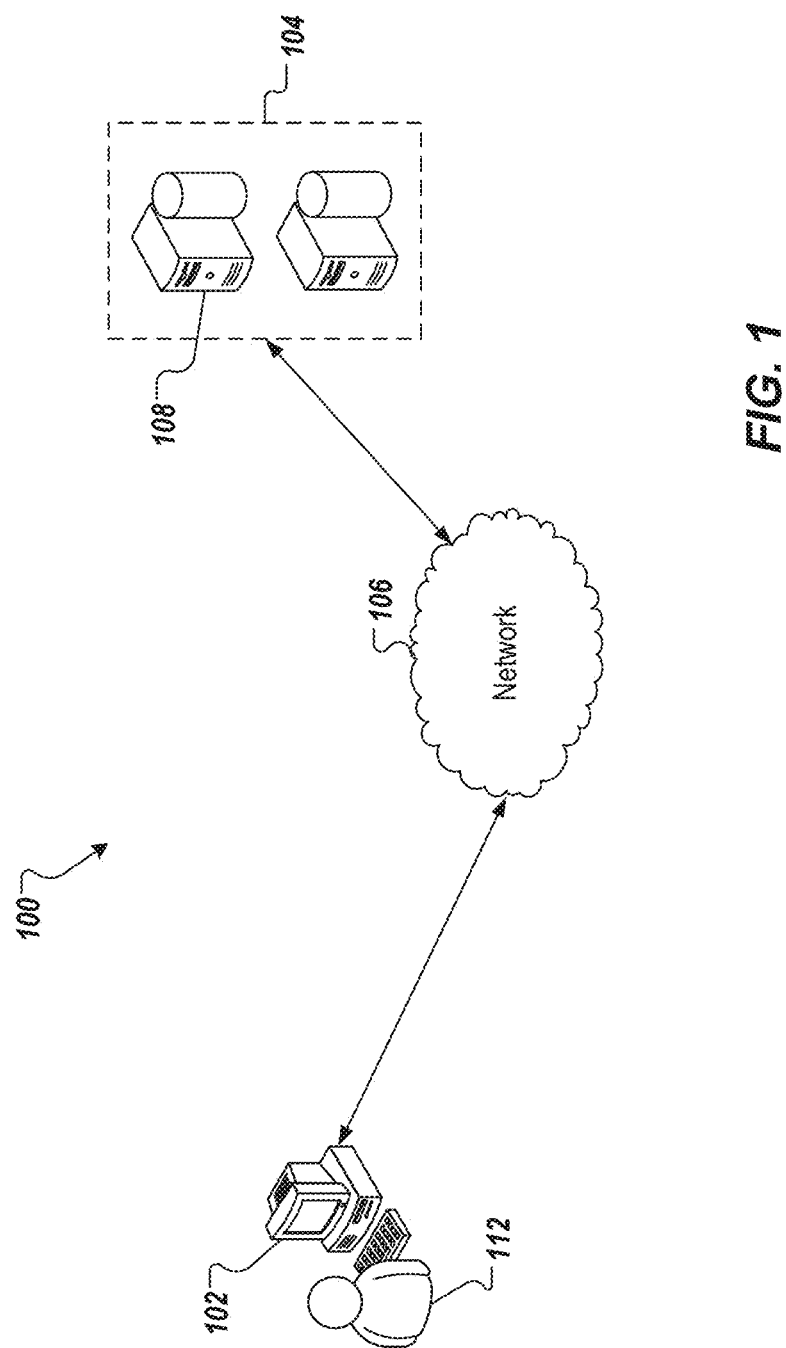
FIG. 1 depicts an example environment that can be used to execute implementations of the present disclosure.

Like reference symbols in the various drawings indicate like elements.

Implementations of the present disclosure are generally directed to providing applications to be executed by central processing units (CPUs) and/or graphics processing units (GPUs). More particularly, implementations of the present disclosure are directed to an object-oriented programming model and interface for developing applications for execution on CPUs and/or GPUs. In some implementations, actions include receiving object-oriented source code defining a set of kernel functions including one or more kernel functions and a set of invocations including one or more invocations, each invocation invoking one or more kernel functions, each kernel function being marked within the object-oriented source code as being GPU-enabled and referencing a GPU grid information object and a GPU grid configuration object, the GPU grid information object defining a number of threads for executing the kernel function within the GPU, and the GPU grid configuration object defining a configuration of threads for executing the kernel function within the GPU, the object-oriented source code capable of being compiled to one of binary code that is executable by a CPU and binary code that is executable by a GPU without modification, compiling the object-oriented source code to provide binary code that is executable by a GPU of an in-memory database system, and executing the binary code using the GPU to execute the kernel function within the in-memory database system.

To provide further context for implementations of the present disclosure, current information technology (IT) trends (e.g., big data, artificial intelligence (AI), machine learning (ML)) require much more data processing and computing power than traditional systems had required. What can be described as an avalanche of digital data is being generated and stored in computing systems. This data is processed to distill and deliver information to users across various domains. Example domains include finance, social media, gaming, healthcare, and the like. These types of workloads can be referred to as throughput-oriented applications. Today's workload demands have significantly increased over those processed by, for example, traditional online transaction processing (OLTP) and online analytical processing (OLAP) systems. Even the most advanced CPUs, including multi-core CPUs, can struggle to meet these increasingly demanding workloads.

As introduced above, GPUs are specialized processors that offer a much higher theoretical computing performance than CPUs and have a better thermal efficiency than CPUs. Consequently, GPU computing has been used for executing workloads of throughput-oriented applications. However, leveraging GPUs for (non-graphics) workload processing can only be achieved with highly parallel algorithms written for GPUs.

Early use of GPUs for non-graphics computations used graphics application programming interfaces (APIs) for general purpose computing. To achieve this, application developers mapped program data to buffer memory and data was operated on through the graphics pipeline. At the time, there was limited hardware support for general purpose programming using GPUs. Over time, however, explicit hardware and software support was introduced, which enabled a broader range of general-purpose computing to be executed on GPUs. For example, NVIDIA Corporation of California, USA introduced CUDA®, which can be described as a parallel computing platform and programming model for general computing on GPUs. The underlying programming model is an extension to the programming language C. As another example, Open Multi-Processing (OpenMP), provided by the OpenMP Architecture Review Board, is an API that supports multi-platform shared memory multiprocessing programming and includes a set of compiler directives, library routines, and environment variables that influence run-time behavior. As still another example, Open Computing Language (OpenCL), provided by the Khronos Group, can be described as a framework that specifies programming languages for programming CPUs and GPUs, among other devices and APIs to control and execute programs on these devices.

Such approaches, however, have certain disadvantages. In some approaches, only simple types (e.g., structs, integral) may be directly transferred to the GPU, while complex types need explicit transfers using low-level memory instructions. In some approaches, memory management (e.g., allocation, destruction) must be explicitly provided for. In some approaches, the program is GPU-specific and cannot be executed by the CPU. In some approaches, synchronization has to be done by atomics and explicit synchronization calls. In some approaches, invalid memory access results in kernel crashes. In some approaches, parallelization is done declaratively using annotations that are not part of the programming language in which the algorithm is implemented.

In view of this, implementations of the present disclosure introduce an object-oriented programming (OOP) model and interface for programming applications to be executed by CPUs and/or GPUs. As described in further detail herein, the OOP model of the present disclosure avoids explicit locks, provides declarative expressions of parallelism, and provides declaration execution phases to provide algorithm-specific synchronization of threads. The OOP model of the present disclosure also provides for memory transfer. In some implementations, automatic transfer of memory to/from GPU is provided and is controlled by lifetime of special transfer objects. In some implementations, automatic transfer of arguments for GPU kernels is provided. Further, algorithms developed with the OOP model of the present disclosure can be executed with increased efficiency on CPU architectures, relative to other programming models, and the same (source) code can be compiled to execute on CPU and/or GPU. In this manner, parallel source code, one for CPU execution, another for GPU execution, is avoided. In some implementations, CPU execution can be used to provide more detailed error information in the event of failures/errors on GPU execution. In some implementations, the OOP model of the present disclosure provides array-like structures that have optional range checks detecting out-of-bounds memory access.

Implementations of the present disclosure are described in further detail herein with reference to an example programming language. The example programming language includes L-Lang, a proprietary programming language provided by SAP SE of Walldorf, Germany. In general, L-Lang can be described as a low-level, high-performance programming language. It is contemplated, however, that implementations of the present disclosure can be realized with any appropriate programming language, and any appropriate context. The OOP model and interface (also referred to herein as OOP platform) can be described as an extension to the programming language.

Implementations of the present disclosure are also described in further detail herein with reference to an example use case. The example use case includes execution of applications within an in-memory database system. An example in-memory database system includes SAP HANA provided by SAP SE of Walldorf, Germany. In general, an in-memory database system uses main memory for data storage. Main memory may include one or more types of memory (e.g., DRAM, NVM) that communicates with one or more processors (e.g., CPU(s)) over a memory bus. An in-memory database system may be contrasted with database management systems that employ a disk storage mechanism. In some examples, in-memory database systems may be faster than disk storage databases, because internal optimization algorithms may be simpler and execute fewer instructions. In some examples, accessing data in an in-memory database system may reduce or eliminate seek time when querying the data, providing faster and more predictable performance than disk-storage databases. In accordance with implementations of the present disclosure, the in-memory database system includes both CPUs and GPUs. In some examples, and as described herein, the CPU does not have its own memory and communicates with main memory directly (e.g., over a memory bus). In some examples, and as also described herein, the GPU has its own memory and communicates with main memory indirectly (e.g., transfer from GPU memory to main memory over a memory bus).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and in view of the example use case, the server system 104 can host an in-memory database system (e.g., SAP HANA). In some implementations, the in-memory database system includes both CPUs and GPUs for executing applications. In some examples, the user 112 can be a developer that uses the OOP platform of the present disclosure to provide applications that can be executed by CPUs and/or GPUs. For example, the user 112 can develop an application (computer-executable program) that executes within the in-memory database system to perform one or more functions (e.g., queries, calculations) to produce one or more results. In some examples, a computing device can use the OOP platform of the present disclosure to provide applications that can be executed by CPUs and/or GPUs. For example, the computing device can automatically (without human intervention) generate an application (computer-executable program) that executes within the in-memory database system to perform one or more functions (e.g., queries, calculations) to produce one or more results.

Figure 2:
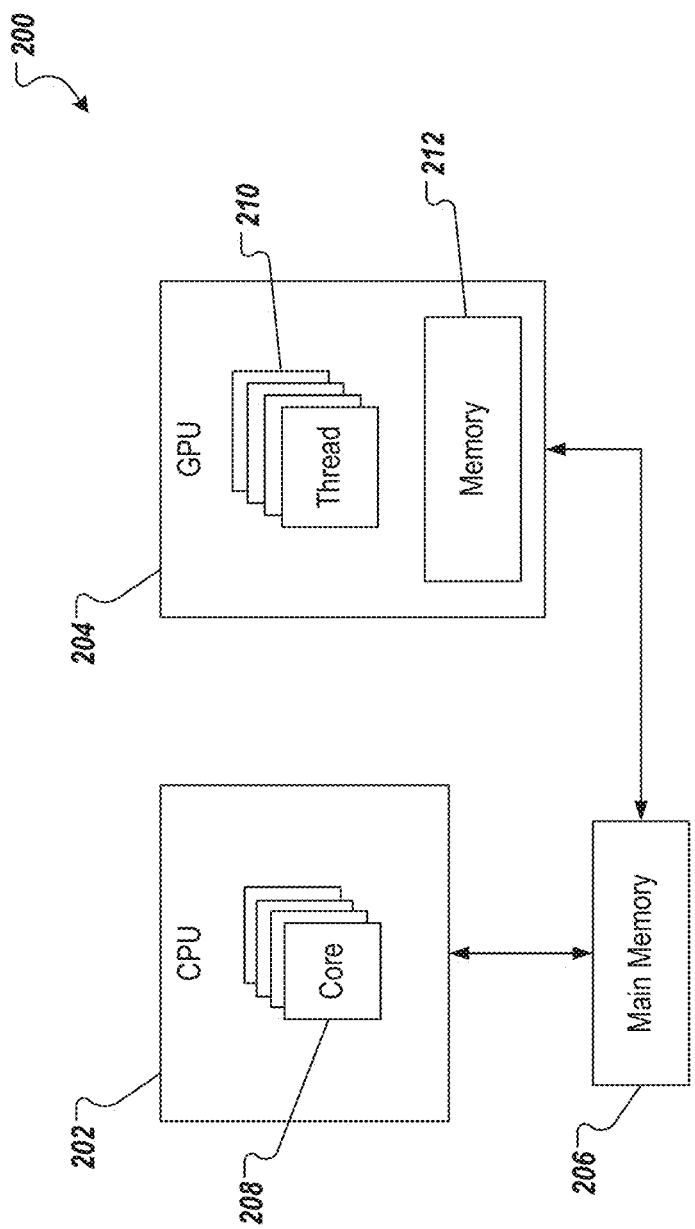
FIG. 2 depicts an example conceptual architecture in accordance with implementations of the present disclosure.

FIG. 2 depicts an example conceptual architecture 200 in accordance with implementations of the present disclosure. The example conceptual architecture 200 can represent a portion of an in-memory database system. In the example of FIG. 2, the conceptual architecture 200 includes a CPU 202, a GPU 204, and a main memory 206. The CPU 202 includes a plurality of cores 208 that each execute one or more instructions of an application. For example, the cores 208 can execute instructions of the application to operate on data stored in the main memory 208. The GPU 204 includes a plurality of threads 210 and an internal memory 212 (also referred to herein as GPU memory). The threads 210 each execute one or more instructions of an application. For example, the threads 210 can execute instructions of the application to operate on data stored in the internal memory 212. In some examples, data is transferred between the main memory 208 and the internal memory 212.

Within the GPU 204, the threads 210 are grouped into so-called warps (or wavefronts), and blocks. Although the term warp can be associated with particular hardware, warp is used throughout the present disclosure without limiting implementations of the present disclosure to such hardware. A warp is a group of thirty-two (32) threads, all threads in a warp executing the same instructions. A block is a n-dimensional group of warps (e.g., n=1, 2, 3). In some examples, if the block size is not divisible by 32, some of the threads in the last warp of the block do not execute any instructions. In some examples, if the block is multi-dimensional (e.g., 2D, 3D), the threads are ordered by first dimension, second dimension, and third dimension, and are split into warps.

In some implementations, the CPU 202 receives human-readable code and compiles the human-readable code to provide machine-executable code. In accordance with implementations of the present disclosure, the human-readable code written using the OOP platform of the present disclosure results in machine-executable code that can be executed by the CPU 202 or machine-executable code that can be executed by the GPU 204. That is, the human-readable code can be compiled to CPU- or GPU-executable code without any modification or extension of the human-readable code (e.g., additional, GPU-specific code). In some examples, the CPU 202 uses the LLVM compiler infrastructure provided by The LLVM Foundation. In some examples, a so-called just-in-time (JIT) compilation can be used for compiling the code. JIT compilation includes execution of a program and compilation during execution of the program at run-time instead of prior to execution. JIT compilation can include bytecode translation to machine code, which is then directly executed.

In some implementations, the CPU 202 and/or the GPU execute instructions of the application written and compiled in accordance with implementations of the present disclosure. In some examples, the CPU 202 uses a single instruction, multiple data (SIMD) execution model for executing instructions of the application. That is, for example, one core 208 executes one instruction on multiple data entries in parallel. In this manner, the CPU 202 provides parallelization within each core 208 and not between cores 208. As described herein, the cores 208 of the CPU 202 directly interact with the main memory 206 (e.g., over a memory bus). In some examples, the GPU 204 uses a single instruction, multiple thread (SIMT) execution model for executing instructions of the application. That is, for example, in a set of threads (e.g., a warp, a block), each thread 210 executes the same instruction on a respective data entry (i.e., all threads execute the same instruction, but on different data entries), which can result in thousands, or millions of threads executing for a single task. As described herein, the threads 210 of the GPU 204 interact with the internal memory 212. Consequently, data transfer is required between the internal memory 212 and the main memory 206.

In accordance with implementations of the present disclosure, the OOP platform provides an object-oriented model and interface to write GPU algorithms, to invoke the algorithms from a CPU, and to transfer data between the main memory (e.g., the main memory 208 of FIG. 2) and the GPU memory (the internal memory 212 of FIG. 2). Implementations of the present disclosure enable a program to be executed by the CPU 202 and/or the GPU 204 without modification to the program and without requiring parallel programs (e.g., a program for the CPU 202 and another program for the GPU). In this manner, implementations of the present disclosure enable execution of the program in scenarios where the GPU is unavailable (e.g., already being used by another program, or the database system does not include a GPU).

Implementations of the present disclosure are described in further detail herein with reference to example object-oriented code. It is contemplated, however, that implementations of the present disclosure are not limited to the specific object-oriented code detailed herein.

FIGS. 3A-3E depict example object-oriented code in accordance with implementations of the present disclosure. More particularly, FIG. 3A depicts example code for an example GPU-enabled function, FIG. 3B depicts example code for an example kernel function and invocation, FIG. 3C depicts example code for object (data) transfer optimization, FIG. 3D depicts example code for execution phases, and FIG. 3E depicts example code for reduction.

With particular reference to FIG. 3A, an example object-oriented code 300 is depicted. The example object-oriented code 300 defines a GPU-enabled function (e.g., calculating distance between two points). In some implementations, a marker 302 (e.g., gpu enabled) indicates a function 304 that is GPU-enabled. In some examples, functions that are marked as GPU-enabled can be executed by either the GPU or the CPU. In this manner, duplicate code (e.g., code for GPU and code for CPU) is avoided. In some implementations, functions marked with the marker 302 (i.e., marked as GPU-enabled) may only use types that are natively available on GPU and built-in functions and methods that have an intrinsic GPU-implementation provided by the programming language. This includes other user-defined functions that are marked as GPU-enabled. In short, a GPU-enabled function can be executed on the GPU or the CPU with the same semantics.

With particular reference to FIG. 3B, an example object-oriented code 310 is depicted. The example object-oriented code 310 defines a kernel function 300a and an invocation 300b, the kernel function executing a calculation on a subset of data (e.g., multiply). In some examples, a kernel function (also referred to as a worker function) is the entry for each of the threads that are started on the GPU. In some examples, each kernel function processes a different subset of data than other kernel functions, and multiple kernel functions can be executed in parallel. A kernel function can be described as the core of a GPU algorithm and the main task of the programmer.

In accordance with implementations of the present disclosure, the kernel function 300a is an ordinary function that is marked with a marker 312 (e.g., the keyword "_gpu_kernel") and includes a thread parameter 314 (e.g., GpuGridInfo). The invocation 300b includes a configuration parameter 316 (e.g., GpuGridConfig), an invocation function 318 (e.g., gpe::gridInvoke), and a bind construct 320 (e.g., _bind). In some implementations, the parameter 314 is a data object that defines to the kernel function the subset of the data that the kernel function is to execute on. The information contained in the parameter 314 is deduced by the given configuration provided by the configuration parameter 316 (GpuGridConfig). In some examples, the first argument of a kernel function is the thread parameter 314 (GpuGridInfo), which contains the total amount of threads (in various dimensions) and the indices that identify this thread. Additional parameters can be specified on the kernel function to pass data.

During compiling, the compiler (e.g., LLVM compiler executed by the CPU) ensures that kernel function marked as _gpu_kernel (GPU kernel function) only contains code that can be executed on GPU. In some examples, when compiling to provide GPU-executable machine-readable code (binary code), in response to the marker "_gpu_kernel," the compiler performs additional checks ensuring that anything written in the function is something that can be run on the GPU. As noted above, if the CPU is to execute the program, the compiler compiles to CPU-executable machine-readable code (binary code).

In some examples, the rules for GPU-enabled functions also apply for GPU kernel functions. Further, a GPU kernel function can call one or more GPU-enabled functions. However, the kernel function may not be called directly. Instead an invoke call is used, which handles the correct invocation of the kernel function with a given configuration on the CPU or the GPU.

To invoke a kernel function, the configuration object 316 tells the runtime how many kernel functions to start and how to group them. The configuration parameter 316, the kernel function(s), and the arguments are passed to the invocation function 318 (gpu::gridInvoke). In some examples, the invocation function 318 decides whether the call will be executed on the GPU or the CPU, and performs all necessary data transfers and launches the kernel. In some examples, the invocation function checks general availability of a GPU. For example, at startup of the database system, an indicator can be provided as to whether GPUs are provided within the database system. As another example, it can be determined whether a GPU within the database system is occupied by another program. In either case, CPU execution of the program to be called. In some implementations, the invocation function can determine which data is to be transferred by storing memory address information of CPU objects that have already been transferred to the GPU. Anything where memory address information is absent would have been transferred to the GPU can safely be assumed to be not transferred yet as any transfer within this design is noticed by the runtime and the corresponding information is created. As a result of the object-oriented approach, the data types are known and data transfer can be automatically executed for simple objects and complex objects.

The invoke call also handles memory transfers if needed. It expects the configuration parameter (GpuGridConfig) as the first argument, which specifies the amount and the configuration of the parallelization. The second argument is the bind construct that expects the kernel function pointer as the first argument and all arguments that have to be passed to the kernel function. The compiler executes compile-time checks to ensure that the parameter count and types match and that the function is marked as "_gpu_kernel."

In accordance with implementations of the present disclosure, during runtime (i.e., during execution of the program), a data object is automatically transferred to the location where it is needed. If the same data object is used for multiple kernel invocations, it can be specified that the data object remains in the GPU, for example, for a certain time. In some example, the lifetime of another data object can be specified for the time. For example, any object bound to a transfer object is transferred to the GPU upon creation of the transfer object and is transferred back to the main memory on destruction of the transfer object. To keep track of all transfers, an additional object, referred to herein as a stream object is provided. In some examples, the stream object carries the knowledge of whether the execution is done on the GPU or the CPU to ensure that no unnecessary transfers are done. In some implementations, the stream object contains a list of all data that has been transferred to the GPU. Each list entry has a CPU memory location of the data (where the data has been fetched from) and a GPU memory location (where the data has been copied to). With this data, the transfers can be performed and it can also be checked if a given main memory location has already been transferred to the GPU. In some examples, the stream object has a flag that indicates whether a GPU is available, so it knows if execution could be performed by a GPU. In some examples, the stream object has a flag that can be set by a programmer to force CPU execution even though a GPU might be available.

In further detail, implementations of the present disclosure provide for implicit memory management and explicit memory management. With regard to implicit memory management, if the invocation function (gpu::gridInvoke) invokes the kernel function to be executed on the CPU, arguments are passed like regular calls (e.g., arguments passed by value are copied, arguments passed by reference are passed directly). If the kernel function is to be executed on the GPU, the invocation function implicitly handles the memory allocation and the transfer. In some examples, simple types (e.g., Float, Int) are copied by a simple memcpy to the GPU memory. In some examples, complex types (e.g., ForeignArray (an array-like type)) have to define a routine for memory transfer to the GPU and from the GPU back to the main memory.

In some implementations, the invocation function performs all needed routines and then invokes the kernel function. After all kernel functions have been finished, the routines to transfer the data objects back to the main memory from the GPU memory are executed. In some implementations, arguments passed by value are not copied back to the CPU (due to the calling convention), and arguments marked as write-only (e.g., marked with _shared_write) do not have to be copied to the GPU, and only transfer to the main memory after execution is performed.

While the implicit memory management is easy to use (e.g., the programmer does not have to account for memory management at all), there are instances, in which implicit transfer of data objects to/from the GPU is not optimal. It is possible that some data is not needed in the main memory between two subsequent invocations of kernel functions (e.g., multiple kernel functions being invoked). Consequently, the data does not need to be transferred back and forth repeatedly for the individual invocations.

In view of this, implementations of the present disclosure provide for explicit memory management. In some examples, a context object, referred to above as a stream object (e.g., gpu::Stream) is instantiated. In some examples, the stream object manages the GPU memory for multiple invocation calls and performs explicit memory transfers. In some examples, only a single instance of the stream object can be provided at any given time.

An example of explicit memory management is described in further detail with reference to FIG. 3C, which depicts an example object-oriented code 330. The example object-oriented code 330 defines a kernel function 330a (e.g., multiply), a kernel function 330b (e.g., add), an invocation 330c, and a transfer 330d. The invocation 330c invokes multiple kernel functions, namely, the kernel function 330a and the kernel function 330b. For example, the invocation 330c includes an invocation function 332 (e.g., callMultipleGpuKernels). A transfer object 332 (e.g., gpu::Transfer) is provided in multiple lines for transfer of respective data objects (e.g., DataArray, ConstantsAdd). In some implementations, by instantiating the transfer object, the input data object (e.g., "data") is transferred to the GPU memory. It can be noted that this transfer to GPU memory only occurs, if the kernel function is executed on the GPU. In the case of CPU execution, the transfer is skipped. In some examples, the gpu::Stream is object is constructed by the line "gpu::Stream stream;" resulting in a stream object named stream. This stream object is passed to the transfer objects upon construction of the transfer objects and is also passed to the gpu::gridInvoke call. In some examples, the transfer objects internally perform the copy operation and insert data about the copy operation into the stream object, so the list of memory that is known to be copied to the GPU is extended by each construction of these transfer objects (and the entry is removed on destruction of the transfer object).

The data is held in the GPU memory until the transfer object leaves scope. More particularly, each object includes some boundary definitions in which the object is present. When the boundary is crossed, the object is destroyed as it is no longer considered as available or needed. Such boundaries are referred to as scope, as they define the scope of the lifetime of objects. In accordance with implementations of the present disclosure, with destruction of the transfer objects, the destruction not only destroys the object, but also performs a routine that handles the copy back from GPU memory to main memory. That is, when the transfer object leaves scope, the transfer object is destroyed and the data is transferred back from the GPU memory to the main memory. In accordance with implementations of the present disclosure, during the lifetime of the transfer object any call (e.g., gpu::gridInvoke) that receives the input object as an argument for the kernel function will skip its transfer, because the data is already located on the GPU. This avoids redundant copies and enables the data to be held within the GPU memory to be used by multiple kernel functions without back/forth transfer to/from main memory between kernel function executions.

For GPU programming, it can be beneficial to have different distribution of workloads for loading of data into shared memory, actual processing, and final aggregation.

This requires the kernel functions to synchronize after each of these steps. Implementations of the present disclosure enable splitting of the coding into multiple phases that are implicitly synchronized. More particularly, some kernel functions are not completely independent from each other. An example can include, without limitation, that after some part of a calculation, a kernel function requires results from one or more other kernel functions. Implementations of the present disclosure support this by enabling a kernel function to be split into execution phases. In some examples, execution phases are consecutive phases (steps) in the kernel function. After execution of a kernel function waits until all other kernel functions have executed the same phase. In the following phase, a kernel function can access results calculated by another kernel function in the previous phase. In this manner, dependencies between kernels can be handled without the risk of creating a deadlock or other synchronization related problems.

FIG. 3D depicts an example object-oriented code 340 for multiple execution phases. The example object-oriented code includes shared markers 342 (e.g., _gpu_shared), which mark respective objects in shared memory on the GPU (e.g., used as a cache). Further, the example object-oriented code includes a first phase 344 (e.g., load), a second phase 346 (e.g., process), and a third phase 348 (e.g., aggregate). It is contemplated, however, that implementations of the present disclosure can be realized with any appropriate number and/or any appropriate type of phases.

In the first phase 344 (load), the data is copied from the global memory (parameter "fi") to the shared memory within the GPU memory. In some examples, the second phase 346 (process) can only be started after all data has been copied. Accordingly, the implicit synchronization is provided for here. In the second phase 346 (process), the actual calculations are executed and the results are stored in the shared memory (variable "fo_shared"). In the third phase 348 (aggregate), the data is aggregated and the result is stored in the global memory (parameter "fo"). This may also only happen after synchronization.

In accordance with implementations of the present disclosure, specification of phases enables synchronization to be provided without the possibility of accidentally producing deadlocks. Further, the declarative approach of the present disclosure enforces structuring of the coding in a way that subsequent synchronized steps are separated, which improves the readability and supportability of the code.

In some implementations, reduction is used to merge a number of partial results into a final result (e.g., adding partial sums to a total sum). Because reduction combines the results of multiple kernel functions, it can only start if all involved kernel functions have completed the computation of the partial results. Despite these dependencies between the kernel functions, the reduction should be executed as fast as possible and thereby as parallel as possible. In view of this, implementations of the present disclosure provide a relatively simple interface to provide for reductions, as described in further detail by way of example with reference to FIG. 3E.

FIG. 3E depicts example object-oriented code 350 for reduction in accordance with implementations of the present disclosure. The example object-oriented code 350 includes a reduction operator 352 (e.g., _reduce). In some examples, the reduction operations uses the thread parameter (e.g., GpuGridInfo, which provides the structure of the parallelization grid described above with reference to FIG. 3B), a group of partial results that should be reduced (e.g., WARP, WARP(n), BLOCK, BLOCK(n), DEVICE (provided as DEVICE in the example of FIG. 3E)), the variable where each kernel function stores its partial result (e.g., partialResult in the example of FIG. 3E), the combine operation which combines two partial results into one (e.g., add in the example of FIG. 3E), and the target storage for the final result (e.g., &finalResult in the example of FIG. 3E).

In accordance with implementations of the present disclosure, by abstracting low level interfaces, the same code can be executed on the GPU (vendor-independent) and on any multi-core CPU keeping the same semantics and a good hardware utilization. This enables the runtime to use the CPU, if no GPU is available (e.g., not present, occupied). In some examples, runtime exceptions or crashes can be reproduced on the CPU, for which better tools and mechanisms for error reporting are available (i.e., better than those available for GPUs). The runtime can also schedule kernels dynamically dependent on the workload of the involved CPUs/GPUs. Further, implementations of the present disclosure enable activation of runtime checks that will report any out-of-bounds access of arrays and other typical failures that are hard to track on a GPU.

As described above, a program that is coded using the OOP platform of the present disclosure can be executed on a CPU or a GPU. That is, the program does not need to be modified for execution on either the CPU or the GPU. With regard to execution of the CPU, because the architecture of current multicore CPUs and GPUs are quite different, the GPU kernel functions (_gpu_kernel) are handled differently on the CPU than on the GPU. For example, on the GPU, one thread is started for each dimension combination in the GPU configuration (GpuGridConfig), which results in millions of threads. However, execution of millions of processes simultaneously is not efficient within a CPU and the overhead for the process is possibly much larger than the execution time of the function itself. Another effect is cache collision, which will cause significant performance penalties as threads in a warp should access adjacent data if possible on the GPU.

In view of this, on the CPU, each warp has to be executed on the same core to achieve efficient execution. Further, it is productive to execute all warps of one block on a core to achieve even more data locality (e.g., for shared memory) and to further reduce the amount of processes the operating system has to schedule and handle. This will enable a high resource utilization as all blocks can be concurrently executed. Due to the possibility of implicit synchronizations (e.g., from execution phases or reduction, described herein), all kernel functions cannot be completely sequenced in one block. Consequently, a phase is executed for all threads of a block followed by an explicit synchronization between the blocks, which are represented by kernel level threads on the CPU. Any subsequent phase continues after the synchronization. As the different kernel functions have local variables, a context switch is provided between the phase execution of each kernel function that stores all local variables of the current kernel function and loads all local variables for the subsequent kernel function. This results in a relatively simple form of user-level threads that do not have a complex scheduling and only produce a relatively small overhead (only the context switch). In some examples, shared object (_gpu_shared) are handled in the same way as the object without the marker. These objects may still increase performance as each block works on its own subset of data reducing the probability of cache collisions between different kernel-level threads.

Figure 4:
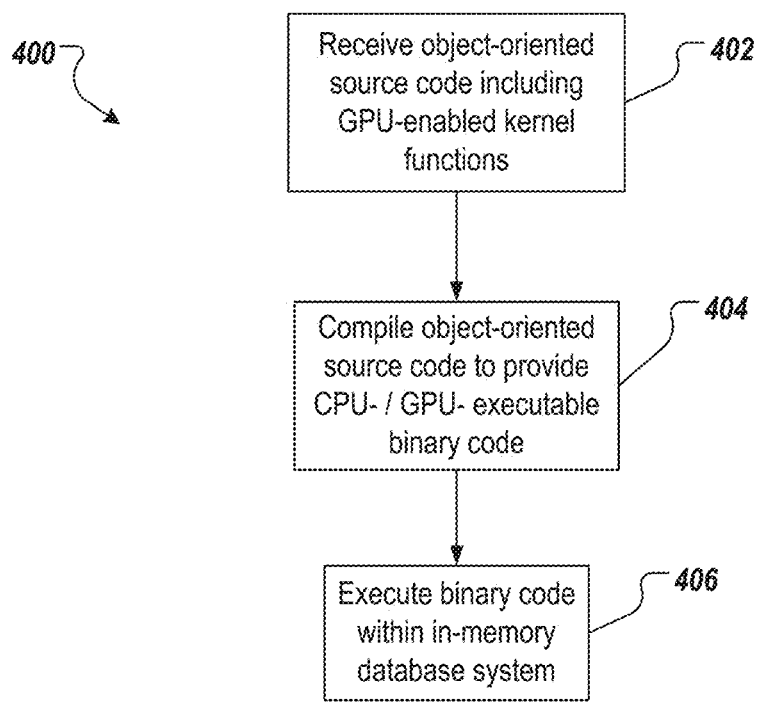
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices.

Object-oriented source code is received (402). For example, the object-oriented source code can be provided in a computer-readable and machine-readable programming language (e.g., L-Lang). In some examples, the object-oriented source code is provided to a CPU of an in-memory database system. For example, a human programmer can provide the object-oriented source code to the CPU (e.g., in a computer-readable file). As another example, a program can provide the object-oriented source code to the CPU (e.g., in a computer-readable file).

In some implementations, and as described herein, the object-oriented source code defines a set of kernel functions including one or more kernel functions and a set of invocations comprising one or more invocations. In some examples, each invocation invokes one or more kernel functions. In some examples, each kernel function is marked within the object-oriented source code as being GPU-enabled and references a GPU grid information object (GpuGridInfo) and a GPU grid configuration object (GpuGridConfig). In some examples, the GPU grid information object defines a number of threads for executing the kernel function within the GPU. In some examples, the GPU grid configuration object defines a configuration of threads for executing the kernel function within the GPU.

In some implementations, an invocation references multiple kernel functions that are to be invoked and defines a transfer for maintaining data within memory of the GPU between invocations of the multiple kernel functions. In some examples, the data is only transferred to main memory of the in-memory database system after the multiple kernel functions have completed execution. In some examples, the transfer references a stream object. In some examples, at least one kernel function defines multiple execution phases based on shared memory within the GPU, every thread completing a phase before any thread can execute a subsequent phase. In some examples, a reduction is defined within the object-oriented source code to merge partial results from multiple kernel functions into a final result, the reduction being executed after all kernel functions of the multiple kernel functions have completed computation of respective partial results. In some examples, the configuration of threads defines one or more of warps of threads and blocks of threads within the GPU.

The object-oriented source code is compiled to provide binary code (404). In accordance with implementations of the present disclosure, the binary code is executable by a CPU of the in-memory database system and is executable by a GPU of the in-memory database system. In some examples, the object-oriented source code is compiled by a CPU of the in-memory database system. In some examples, the CPU compiles the object-oriented source code using a LLVM compiler. The binary code is executed within the in-memory database system (406). For example, the binary code is executed by the GPU to execute kernel functions within the in-memory database system.

Figure 5:
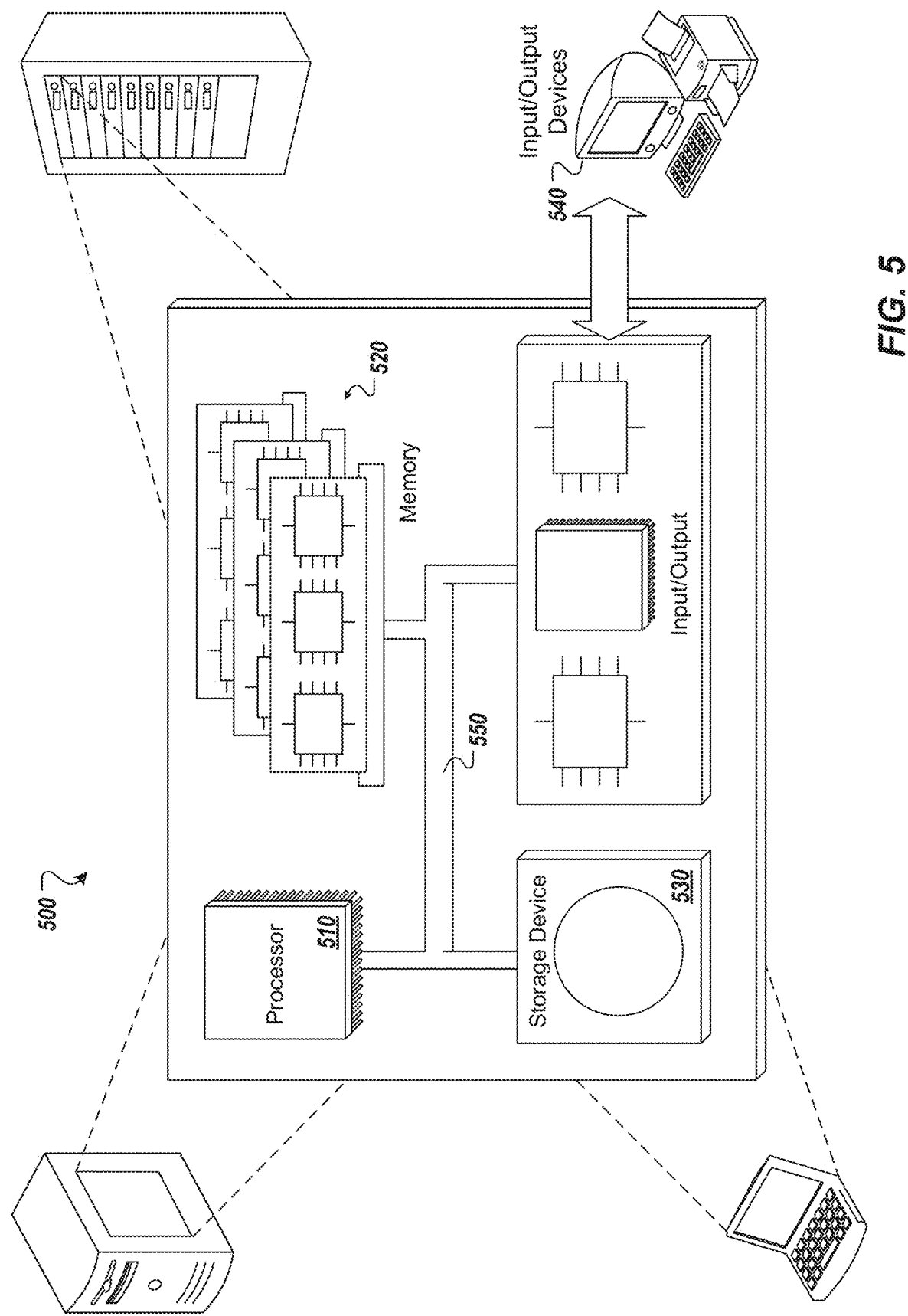
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for execution of a program in one or more of a central processing unit (CPU) and a graphics processing unit (GPU), the method comprising:

receiving object-oriented source code defining a set of kernel functions comprising one or more kernel functions and a set of invocations comprising one or more invocations, each invocation invoking one or more kernel functions, each kernel function being marked within the object-oriented source code as being GPU-enabled and referencing a GPU grid information object and a GPU grid configuration object, the GPU grid information object defining a number of threads for executing the kernel function within the GPU, and the GPU grid configuration object defining a configuration of threads for executing the kernel function within the GPU, the object-oriented source code capable of being compiled to one of binary code that is executable by a CPU and binary code that is executable by a GPU without modification, wherein a reduction is defined within the object-oriented source code to merge partial results from multiple kernel functions into a final result, the reduction being executed after all kernel functions of the multiple kernel functions have completed computation of respective partial results;

compiling the object-oriented source code to provide binary code that is executable by a GPU of an in-memory database system; and executing the binary code using the GPU to execute the kernel function within the in-memory database system.

2. The method of claim 1, wherein an invocation references multiple kernel functions that are to be invoked and defines a transfer for maintaining data within memory of the GPU between invocations of the multiple kernel functions, the data only being transferred to main memory of the in-memory database system after the multiple kernel functions have completed execution.

3. The method of claim 2, wherein the transfer references a stream object.

4. The method of claim 1, wherein at least one kernel function defines multiple execution phases based on shared memory within the GPU, every thread completing a phase before any thread can execute a subsequent phase.

5. The method of claim 1, wherein the configuration of threads defines on or more of warps of threads and blocks of threads within the GPU.

6. The method of claim 1, wherein the object-oriented source code is compiled by the CPU within the in-memory database system and is provided to the GPU for execution.

7. A non-transitory computer-readable storage medium coupled to one or more processors and having instructions stored thereon which, when executed by the one or more processors, cause the one or more processors to perform operations for execution of a program in one or more of a central processing unit (CPU) and a graphics processing unit (GPU), the operations comprising:

receiving object-oriented source code defining a set of kernel functions comprising one or more kernel functions and a set of invocations comprising one or more invocations, each invocation invoking one or more kernel functions, each kernel function being marked within the object-oriented source code as being GPU-enabled and referencing a GPU grid information object and a GPU grid configuration object, the GPU grid information object defining a number of threads for executing the kernel function within the GPU, and the GPU grid configuration object defining a configuration of threads for executing the kernel function within the GPU, the object-oriented source code capable of being compiled to one of binary code that is executable by a CPU and binary code that is executable by a GPU without modification, wherein a reduction is defined within the object-oriented source code to merge partial results from multiple kernel functions into a final result, the reduction being executed after all kernel functions of the multiple kernel functions have completed computation of respective partial results;

compiling the object-oriented source code to provide binary code that is executable by a GPU of an in-memory database system; and executing the binary code using the GPU to execute the kernel function within the in-memory database system.

8. The computer-readable storage medium of claim 7, wherein an invocation references multiple kernel functions that are to be invoked and defines a transfer for maintaining data within memory of the GPU between invocations of the multiple kernel functions, the data only being transferred to main memory of the in-memory database system after the multiple kernel functions have completed execution.

9. The computer-readable storage medium of claim 8, wherein the transfer references a stream object.

10. The computer-readable storage medium of claim 7, wherein at least one kernel function defines multiple execution phases based on shared memory within the GPU, every thread completing a phase before any thread can execute a subsequent phase.

11. The computer-readable storage medium of claim 7, wherein the configuration of threads defines on or more of warps of threads and blocks of threads within the GPU.

12. The computer-readable storage medium of claim 7, wherein the object-oriented source code is compiled by the CPU within the in-memory database system and is provided to the GPU for execution.

13. A system, comprising:

one or more computers; and a computer-readable storage device coupled to the computing device and having instructions stored thereon which, when executed by the computing device, cause the computing device to perform operations for execution of a program in one or more of a central processing unit (CPU) and a graphics processing unit (GPU), the operations comprising:

receiving object-oriented source code defining a set of kernel functions comprising one or more kernel functions and a set of invocations comprising one or more invocations, each invocation invoking one or more kernel functions, each kernel function being marked within the object-oriented source code as being GPU-enabled and referencing a GPU grid information object and a GPU grid configuration object, the GPU grid information object defining a number of threads for executing the kernel function within the GPU, and the GPU grid configuration object defining a configuration of threads for executing the kernel function within the GPU, the object-oriented source code capable of being compiled to one of binary code that is executable by a CPU and binary code that is executable by a GPU without modification, wherein a reduction is defined within the object-oriented source code to merge partial results from multiple kernel functions into a final result, the reduction being executed after all kernel functions of the multiple kernel functions have completed computation of respective partial results;

compiling the object-oriented source code to provide binary code that is executable by a GPU of an in-memory database system; and executing the binary code using the GPU to execute the kernel function within the in-memory database system.

14. The system of claim 13, wherein an invocation references multiple kernel functions that are to be invoked and defines a transfer for maintaining data within memory of the GPU between invocations of the multiple kernel functions, the data only being transferred to main memory of the in-memory database system after the multiple kernel functions have completed execution.

15. The system of claim 14, wherein the transfer references a stream object.

16. The system of claim 13, wherein at least one kernel function defines multiple execution phases based on shared memory within the GPU, every thread completing a phase before any thread can execute a subsequent phase.

17. The system of claim 13, wherein the configuration of threads defines on or more of warps of threads and blocks of threads within the GPU.

* * * * *